(12) United States Patent
Pena et al.

(10) Patent No.: US 12,147,548 B1
(45) Date of Patent: Nov. 19, 2024

(54) SYSTEMS AND METHODS FOR ASSESSING A USER'S PRIVACY PROTECTION TOOLS

(71) Applicant: United Services Automobile Association (USAA), San Antonio, TX (US)

(72) Inventors: Ric M. Pena, Boerne, TX (US); Arthur Quentin Smith, Fredericksburg, TX (US); Brian Tougas, Spring Branch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/443,703

(22) Filed: Jul. 27, 2021

Related U.S. Application Data

(60) Provisional application No. 63/057,605, filed on Jul. 28, 2020.

(51) Int. Cl.
*G06F 21/60* (2013.01)

(52) U.S. Cl.
CPC .................. *G06F 21/604* (2013.01)

(58) Field of Classification Search
CPC .................................................. G06F 21/604
See application file for complete search history.

(56) References Cited

U.S. PATENT DOCUMENTS

| | | | |
|---|---|---|---|
| 10,032,037 B1 * | 7/2018 | Allen | G06F 21/62 |
| 10,181,043 B1 * | 1/2019 | Pauley, Jr | H04L 63/20 |
| 2009/0119298 A1 * | 5/2009 | Faitelson | G06F 21/604 |
| | | | 707/999.009 |
| 2014/0137264 A1 * | 5/2014 | Bilogrevic | G06F 21/54 |
| | | | 726/27 |
| 2014/0214610 A1 * | 7/2014 | Moshir | G06Q 20/4016 |
| | | | 705/26.35 |
| 2015/0310209 A1 * | 10/2015 | Zhang | G06F 8/61 |
| | | | 717/174 |
| 2018/0375892 A1 * | 12/2018 | Ganor | H04L 63/20 |
| 2020/0050789 A1 * | 2/2020 | Yang | G06F 21/6245 |

* cited by examiner

*Primary Examiner* — Kevin Bechtel
*Assistant Examiner* — Forrest L Carey
(74) *Attorney, Agent, or Firm* — Fletcher Yoder, P.C.

(57) ABSTRACT

The present disclosure is related to a system that may include a storage component and a computing device. The storage component may store applications and datasets associated with a user. The computing device may execute each of the applications. One of the applications may perform operations, including receiving a list of the applications, determining a privacy exposure of the user based on at least a portion of the datasets accessed by the applications, and generating a privacy report based on the privacy exposure.

18 Claims, 8 Drawing Sheets

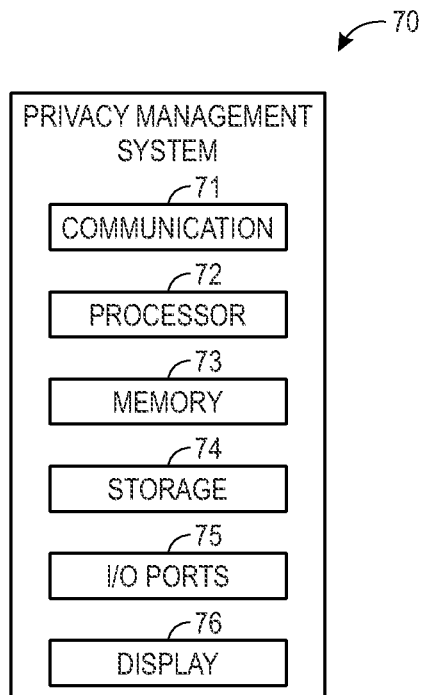
FIG. 2
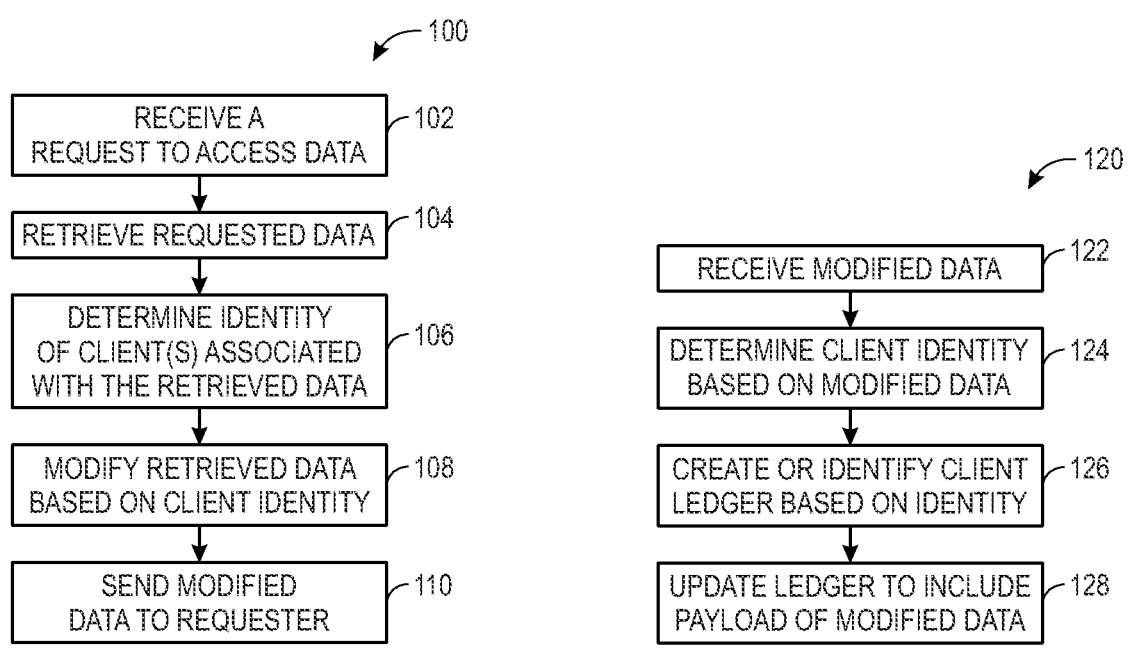
FIG. 3
FIG. 4

SYSTEMS AND METHODS FOR ASSESSING A USER'S PRIVACY PROTECTION TOOLS

CROSS-REFERENCE TO RELATED APPLICATION

This application claims priority to and the benefit of U.S. Provisional Application No. 63/057,605, entitled "SYSTEMS AND METHODS FOR ASSESSING A USER'S PRIVACY PROTECTION TOOLS," filed Jul. 28, 2020, which is hereby incorporated by reference in its entirety for all purposes.

BACKGROUND

The present disclosure relates generally to providing privacy protection for personal data usage. More specifically, the present disclosure relates to analyzing privacy data exposure and providing privacy reports to facilitate preventing or resolving privacy concerns.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Increasing data privacy concerns are driving new privacy regulations to protect personal data usage online (e.g., over the internet) and offline (e.g., over mailed marketing advertisements). In response to emerging privacy regulations, organizations (e.g., companies) may be pressed to provide improved personal data protection for their clients in comply with the new privacy regulations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a storage component and a computing device. The storage component may store multiple applications and multiple datasets associated with a user. The computing device may execute the multiple applications. One application of the multiple applications may perform operations, including receiving a list of the multiple applications, determining a privacy exposure of the user based on at least a portion of the multiple datasets accessed by the multiple applications, and generating a privacy report based on the privacy exposure.

In another embodiment, a method may include receiving a list of multiple applications stored on a storage component and determining types of data collected by the applications based on multiple datasets associated with the multiple applications. The multiple datasets is stored in the storage component. The method may also include sending a request for access to multiple additional datasets stored in one or more additional storage components accessible to multiple providers providing the multiple applications and receiving the multiple additional datasets from the multiple providers. The method may further include determining a privacy exposure associated with the user based on the multiple datasets and the multiple additional datasets and generating a privacy report based on the privacy exposure.

In yet another embodiment, a non-transitory, computer-readable medium storing computer-executable instructions is provided. The instructions, when executed by one or more processors, cause the one or more processors to receive a list of multiple applications stored on a storage component and to determining types of data collected by the applications based on multiple datasets associated with the multiple applications. The instructions also cause the one or more processors to send a request for access to multiple additional datasets stored in one or more additional storage components accessible to multiple providers that provides the multiple applications and to receive the multiple additional datasets from the multiple providers. The instruction further causes the one or more processors to determine a privacy exposure associated with the user based on the multiple datasets and the multiple additional datasets and to generate a privacy report based on the privacy exposure.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein:

FIG. 2 illustrates a block diagram of the privacy management system of FIG. 1, in accordance with embodiments described herein;

FIG. 3 illustrates a flow diagram of a method for retrieving data corresponding to a client in response to a request for accessing the data, in accordance with embodiments described herein;

FIG. 4 illustrates a flow diagram of a method for creating a client ledger in response to granting access to data corresponding to a client, in accordance with embodiments described herein;

DETAILED DESCRIPTION

Figure 1:
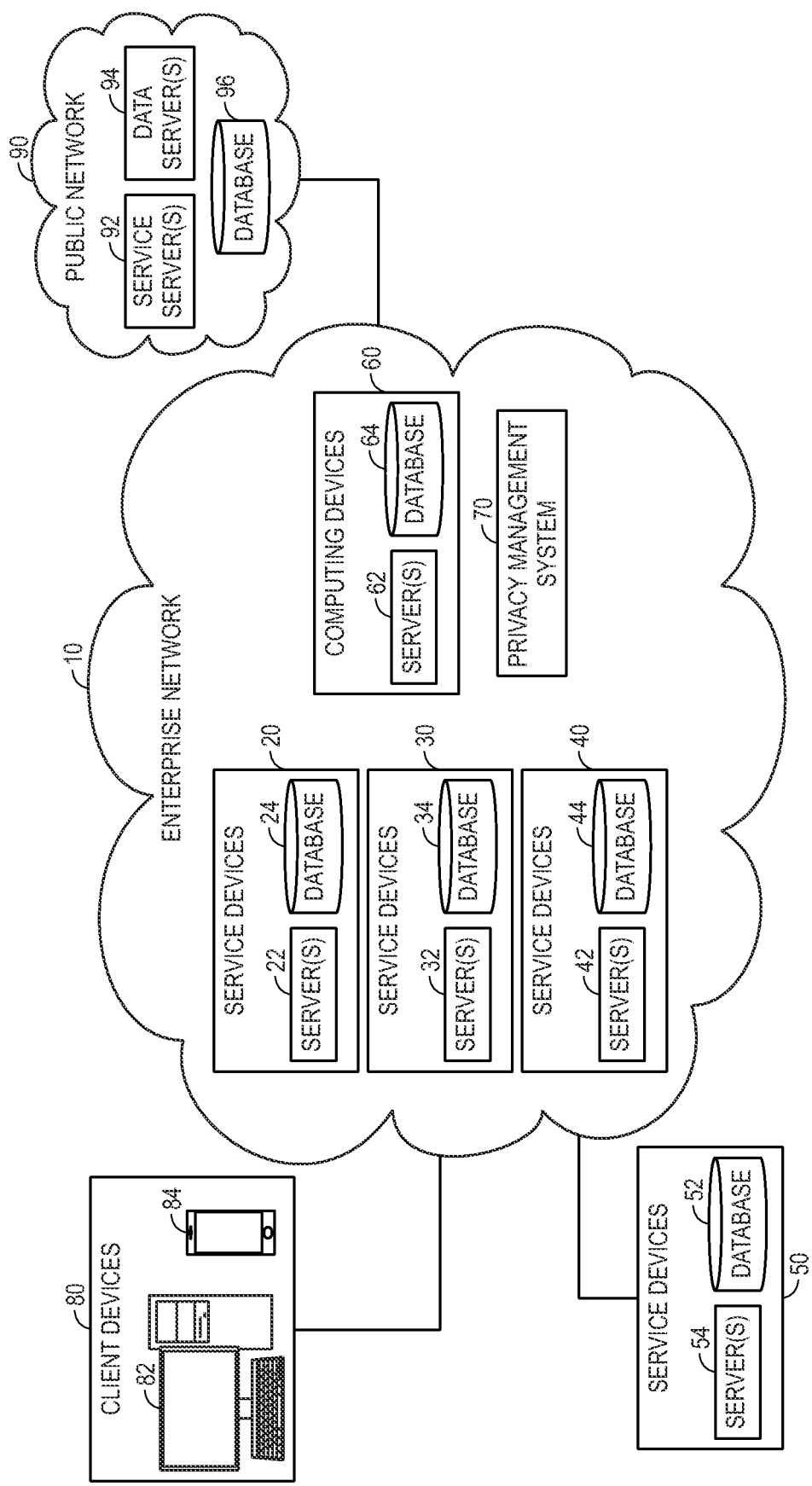
FIG. 1 illustrates a block diagram of a system for aggregating and analyzing data exposure from various sources using a privacy management system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

Proliferating privacy regulations, such as the California Consumer Privacy Act (CCPA) and the EU General Data Protection Regulation (GDPR), present growing challenges for organizations (e.g., companies) around the world to track privacy exposure and build privacy protection programs to address privacy concerns for customers, employees, and other users. For example, although not directly imposing specific data security requirements, the CCPA establishes a right of action for certain data breaches caused by lack of certain security practices and procedures to control a risk of data breach. Similarly, the GDPR specifies certain organizational measures to ensure that the risk of data breach is minimized.

As privacy regulations become more prevalent on personal data usage, organizations may face new challenges to provide improved privacy protections for their clients and other users who may use services and/or products provided by the organizations. For example, some organizations may be regulated to respond to client requests for personal data available to the organizations (e.g., client data stored in ledgers and other databases). Such client requests may include limiting certain personal data to be used within corresponding organizations, deleting certain personal data when the clients no longer want the corresponding organization(s) to have the specified personal data, and/or demanding that the specified personal data should not be sold to or shared with other entities (e.g., third parties). The constantly growing requirement associated with the privacy regulations and client requests may drive the organizations to utilize new technologies to accommodate these requirements more efficiently.

With the foregoing in mind, in an embodiment, privacy management system may receive data that corresponds to a number of clients from various data sources. After receiving each dataset regarding a particular client, the privacy management system may determine an identification number, code, or parameter associated with the client and create a digital ledger to track the data received for each client. Each ledger may include a header containing the identification parameter and a payload that includes other data entries received by the privacy management system. The ledgers may be dynamic ledgers that may grow when receiving additional data. The ledgers may recede in size when the data is deleted or modified. In some embodiments, the payload of the ledger may be structured according to a particular order, such that different types of data are stored in different positions or offsets with respect to the header. In this way, other computing systems may request a collection of data from the privacy management system by sending a query request to the privacy management system to retrieve data entries of a number of ledgers associated with a number of clients based on the position or offset of the particular dataset. The use of offset may include numerous methods of storing and retrieving data known to those familiar with the art of data storage. This phrase does not exclude any data structure or access methods and may include the likes of sequential data, indexed data, relational data, tabular/columnar data, immutable data, unstructured data, and the like. The privacy management system may retrieve payload data from the same offset position in multiple ledgers and provide the retrieved data to the other computing devices requesting the data entries. By coordinating the access of the other computing devices to the data entries, the privacy management system may provide the requested data to the requesting devices without providing information related to the identity of the client or owner of the datasets.

In addition, by tracking the data collected for each individual, the privacy management system may also determine a privacy exposure of each client based on the ledgers generated for each client. Using the datasets stored on the ledgers, the privacy management system may generate a privacy report based on the privacy exposure of the client determined based on the amount of data entries, identity of accessors (or lack of identity), access volume (the amount of data is being accessed), access frequency, rate of access requests (drop/surge of requests), age of data entries, location of requestors, time of access requests (times when duplicate access is less likely to occur), the type of data entries, or the substance of the data entries present in the respective ledgers. Additional details with regard to analyzing privacy data exposure, along with other technologies for consolidating privacy data exposure associated with the clients/users into privacy reports, will be discussed in detail below with reference to FIGS. 1-7.

Privacy Management System

By way of introduction, FIG. 1 illustrates a block diagram of a system for aggregating and analyzing personal data exposure from various sources using a privacy management system. The system may include an enterprise network 10, client devices 80, and a public network 90. The enterprise network 10, the client devices 80, and the public network 90 may communicate with each other using a variety of communication protocols. The communication protocols may include Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The enterprise network 10 may be a network operated by an organization (e.g., a bank, an insurance company, or a financial group). For example, the enterprise network 10 may be a private network, such as local area network (LAN) that includes a variety of computing and network devices including, but are not limited to, switches, servers (e.g., processors), storage (e.g., memory) and routers. The enterprise network 10 may include restrictions and access rules established in order to relegate access to selected users (e.g., clients, employees, third party service providers, regulatory representatives). The organization may use the enterprise network 10 to provide a variety of services for the clients. In some embodiments, the enterprise network may actually be off premises (e.g., in a cloud or the like).

The public network 90 may be a type of network accessible to general public (including the organization, the clients, and other organizations and their clients/users) and connected to other private networks. The public network 90 may include service servers 92, data servers 94, databases 96, and other network devices such as gateways, switches and routers. The public network 90 may directly provide, or may be used as platforms (e.g., by other organizations) to provide, a different variety of services for the clients.

In an embodiment, an organization (e.g., a bank) may use the enterprise network 10 to provide online banking services, such as checking and saving accounts, debit and credit cards and other payment services, mortgage loans, and investment management, and the other personal banking related services. Such services may be provided as service applications (e.g., web browser applications, mobile applications), which may be accessible to one or more client devices 80 via a gateway between the client devices 80 and the enterprise network 10. The organization may include a banking department providing the clients with personal checking and/or saving services. The personal checking and/or saving services may be hosted and managed on service devices 20, which may include one or more servers 22 and a database 24. The one or more servers 22 may provide support for executing personal checking and/or saving related applications. The clients' personal data (e.g., names, ages, addresses, phone numbers, and social security numbers), may be processed by the one or more servers 22 and stored in the database 24. The organization may also include payment services, such as a debit and credit cards department providing the clients with debit and credit cards services. The debit and credit cards services may be hosted and managed on service devices 30, which may include one or more servers 32 and a database 34. The one or more servers 32 may provide support for running debit and credit cards related applications. The clients' personal data (names, date of birth, addresses, and incomes) may be processed by the one or more servers 32 and stored in the database 34. The organization may also include a mortgage loan department providing the clients with mortgage loan services. The mortgage loan services may be hosted and managed on service devices 40, which may include one or more servers 42 and a database 44. The one or more servers 42 may provide support for running mortgage loan related applications. The clients' personal data (e.g., names, addresses, ages, marriage status, home values, bank information, employments, and salaries) may be processed by the one or more servers 42 and stored in the database 44.

In an embodiment, the organization may include one or more departments executing services via service devices located outside the enterprise network 10 (e.g., in a cloud, such as a private cloud, a public cloud, or a hybrid cloud), which may be accessed by the clients remotely via the enterprise network 10. For example, the organization may include an investment department providing the clients with personal investment services. The personal investment services may be hosted and managed on service devices 50 located outside the enterprise network 10. The service devices 50 may include one or more servers 52 and a database 54. The one or more servers 52 may provide support for running investment management related applications. The clients' personal data (e.g., names, date of birth, emails, incomes, bank and/or credit card information, and tendencies) may be processed by the one or more servers 52 and stored in the database 54.

Additionally or alternatively, the organization may include a data service department providing data services (e.g., storage, backup, data analysis, computation, modeling, data mining, or machine learning) for service departments (such as the banking department, the debit and credit cards department, the mortgage loan department, and/or the investment department). The data services may be hosted, managed, and executed on computing devices 60. The computing devices 60 may include one or more servers 62 and a database 64. The one or more servers 62 may provide support for running data management related applications. The clients' personal data (e.g., client identification, data of birth, first name, last name, social security, and age) may be processed by the one or more servers 62 and stored in the database 64. Although the service devices 20, 30, 40, and 50 and the computing devices 60 are described with respect to specific operations, it should be noted that the present embodiments described herein may be implemented in any suitable service device or department. That is, the presently disclosed embodiments should not be limited the examples provided in FIG. 1. Instead, the embodiments described herein may be applied to any data source that collects data related to individuals or other entities for a variety of services.

As illustrated, a client may access one or more services provided by the organization using one or more client devices 80. The client devices 80 may include a variety of suitable devices, such as a desktop computer 82, a smartphone 84, a laptop, or a tablet. The client devices 80 may have access to the enterprise network 10 directly (e.g., through a specific virtual private network (VPN) connection) or indirectly (e.g., via the public network 90 and with certain security protocols). During an access to a service provided by the organization via the enterprise network 10, the client's personal data (such as name, address, phone number, email address, age, and social security number) may be utilized (e.g., recorded, verified, processed, analyzed, modified, and modeled) by the organization using one or more service devices (such as service devices 20, 30, 40, and 50, and/or computing devices 60).

Additionally or alternately, the client may access other services provided by the public network 90 using one or more client devices 80. For example, the client may access some services directly provided by the public network 90 (e.g., online shopping, membership enrollments, or charity donations), or may access other services provided by other organizations that may use the public network 90 as service platforms (e.g., home insurance and auto insurance). During an access to a service provided by the public network 90 (directly or indirectly), the client's personal data (such as name, address, phone number, email, age, social security number, bank and/or credit card information) may be utilized (e.g., recorded, verified, processed, analyzed, and modeled) by one or more service devices (such as service servers 92 and/or data servers 94).

The client's personal data may contain privacy-related data or data that are categorized as sensitive or data that clients may designate as private. That is, privacy-related data may be related to properties or details of individuals or groups that the individuals or groups may wish to remain secure and private. For example, the privacy-related data (referred to as privacy data hereafter) may include personal identification, name, social security number, age, address, phone number, email, gender, race, medical condition, health information, financial record, and so on. Privacy data exposure (referred to as privacy exposure hereafter) may be related to hacking or compromising activities that may result in the privacy data becoming available to others, such as collecting, processing, disseminating, and invading privacy data without consent and/or authorization from a data owner (e.g., the client). The privacy report may also include a tracking record of the types or portions of the client data that may be used maliciously (e.g., by certain entities) to steal someone's identity, target someone for scams, and the like. Some entities may share or sell client data (e.g., name, age, address, or picture) to other entities without the client's or owner's consent or authorization. In some embodiments, the privacy report may include other uses of the client data. For example, the clients may change their decisions regarding the use of personal data and decide to redact or delete at least a portion of their personal data for a variety of reasons such as changes due to an event (e.g., divorce), a desire to protect privacy, a desire to protect a dependent, a desire to exclude someone who has previously accessed their personal data, and the like.

To protect privacy data for the client, the organization may use a privacy management system 70 to track and analyze the client's privacy exposure. For example, when the client's privacy data is accessed, a client ledger (e.g., a blockchain or an array of data) may be created if no ledger associated with the client exists or modified if the client ledger has been created previously. The client ledger may be created or modified by a service device from the service devices (such as service devices 20, 30, 40, and 50) or one of the computing devices 60. The client ledger may be stored in a database from the databases 24, 34, 44, 54, and 64. The client ledger may keep an account of the type of data associated with the particular client that is stored in a database or other storage component by the respective service device or computing device.

Using the client ledgers, the privacy management system 70 may track or audit the privacy data exposure of clients based on the data that other service devices or computing devices may have stored in their respective ledgers. By tracking the privacy data stored in client ledgers, the privacy management system 70 may identify the location of the stored privacy data, a time in which the privacy data is accessed, and a reason in which the privacy data of the client is accessed.

Referring now to FIG. 2, a block diagram of example components of the privacy management system 70. For example, the privacy management system 70 may include a communication component 71, a processor 72, a memory 73, a storage 74, input/output (I/O) ports 75, a display 76, and the like. The communication component 71 may facilitate communication between the privacy management system 70 and the other devices depicted in FIG. 1, such as the service devices 20, 30, 40, and 50, and the computing devices 60. Additionally, the communication component 71 may facilitate data transfer to the privacy management system 70, such that the privacy management system 70 may receive data from the other devices depicted in FIG. 1 and the like.

The processor 72 may be any type of computer processor or microprocessor capable of executing computer-executable code. The processor 72 may also include multiple processors that may perform the operations described below.

The memory 73 and the storage 74 may be any suitable articles of manufacture that can serve as media to store processor-executable code, data, or the like. These articles of manufacture may represent computer-readable media (e.g., any suitable form of memory or storage) that may store the processor-executable code used by the processor 72 to perform the presently disclosed techniques. The memory 73 and the storage 74 may also be used to store data described (e.g., privacy-related data), various other software applications for analyzing the data, and the like. The memory 73 and the storage 74 may represent non-transitory computer-readable media (e.g., any suitable form of memory or storage) that may store the processor-executable code used by the processor 72 to perform various techniques described herein. It should be noted that non-transitory merely indicates that the media is tangible and not a signal.

The I/O ports 75 may include interfaces that may couple to other peripheral components such as input devices (e.g., keyboard, mouse), sensors, input/output (I/O) modules, and the like. The display 76 may operate to depict visualizations associated with software or executable code being processed by the processor 72. In an embodiment, the display 76 may be a touch display capable of receiving inputs from a user of the privacy management system 70. The display 76 may be any suitable type of display, such as a liquid crystal display (LCD), plasma display, or an organic light emitting diode (OLED) display, for example. Additionally, in an embodiment, the display 76 may be provided in conjunction with a touch-sensitive mechanism (e.g., a touch screen) that may function as part of a control interface for the privacy management system 70.

It should be noted that the components described above with regard to the privacy management system 70 are exemplary components and the privacy management system 70 may include additional or fewer components as shown. Moreover, the client devices 80 and the servers described above may include similar components described as part of the privacy management system 70.

With the foregoing in mind, to enable the privacy management system 70 to track the privacy data exposure of clients, servers (e.g., server 22) or other suitable computing devices described above with respect to FIG. 1, may store data according to a particular order, arrangement, or format. The format may be preserved across the enterprise network 10 and outside the enterprise network 10, such that different types of data for every client may be stored in the same order or format. Prior to storing the data according to the particular order or format, the server 22 may send a request to a data source, which may preserve or encrypt identity parameters of the client prior to facilitating the request of the server 22.

For example, FIG. 3 illustrates a flow diagram of a method 100 for retrieving privacy data corresponding to a client in response to a request for accessing the privacy data. Although the method 100 described in FIG. 3 is described in a particular order and as being performed by a particular component, it should be understood that the method 100 may be performed in any suitable order and by any suitable computing device or application.

In an embodiment, the server 22 or other suitable computing devices may receive a request to access a data (block 102) regarding one or more clients from another server 32 or other computing device. For example, the request may be made by the debit and credit cards department via a service device from the service devices 30 to collect outstanding debt information for one or more clients. Facilitating the request may involve accessing bank information associated with the clients, thereby exposing personal data of the client, such as name, account number, checking and/or saving account balances, and other data unrelated to the outstanding balance.

In response to receiving the request for data, the server 22 may query the database 24 or other suitable storage component to retrieve the requested data (block 104). In some embodiments, the database 24 may store data for each client in a format that includes an identification parameter associated with the identity of the respective client. The identification parameter may be used by the server 22 or the privacy management system 70 to track the usage of the client's data (e.g., by the servers 22, 32, 42, 52 and 62). That is, the database 24 may associate every piece of data it stores or collects with the respective identification parameter of the client. Thus, each distinct piece of data may also be stored with a corresponding identification parameter to keep track of each individual client's data. Additional details with regard to the format in which client data may be stored will be discussed below with reference to FIG. 5.

After the server 22 retrieves the requested data at block 104, the server 22 may determine the identity of the client associated with the retrieved data (block 106). For example, the data stored on the database 24 may include a header portion that specifies the identification parameter or client associated with the respective data.

After identifying the requested data and determining the identity of the client associated with the retrieved data, the server 22 may modify retrieved data to protect the identity of the client (block 108). For example, the identification parameter of the client in the retrieved data may be encrypted or anonymized to protect privacy of the client. After modifying the retrieved data, the server 22 may send the modified data to the server 42 (block 110). As such, even though the server 42 has access to the requested data, the portion of the data that is attributed to the identity of the client is unable to be utilized by the server 42. Nevertheless, the server 42 may still analyze the substantive portion of the data.

After receiving the modified data, the server 42 may store the modified data in a similar fashion as the server 22 stored the data. In addition, the server 42 may generate a client ledger that may be a data structure for storing data related to each individual identification parameter (e.g., encrypted or decrypted). In some embodiments, the server 22 mentioned above with respect to FIG. 3 may store data in a similar ledger format.

With this in mind, FIG. 4 illustrates a flow diagram of a method 120 for creating a client ledger after receiving data corresponding to a client. Although the method 120 described in FIG. 4 is described in a particular order and as being performed by a particular component, it should be understood that the method 120 may be performed in any suitable order and by any suitable computing device or application.

Referring now to FIG. 4, the server 42 may receive the modified data (block 122) after the modified data is sent by the server 22, as described above with respect to FIG. 3. As mentioned above, the modified data may include the client identity information containing an encrypted or anonymized identification parameter associated with the client. In some embodiments, the server 42 may use a decryption key or the like to determine the identification parameter of the client (block 124).

After the identification parameter of the client is determined, the server 42 may create new client ledger to store the received data. Alternatively, if a client ledger already exists for the client, the server 42 may identify the client ledger associated with the identification parameter of the client (block 126).

After the client ledger is created or identified, the server 42 may update the client leger to include the payload portion of the modified data (block 128) received at block 122. In some embodiments, the client ledger may be a dynamic ledger data structure that may continuously change to store additional data relevant to the respective client. The dynamic ledger data structure may be a collection of data types stored in a particular format, such that the data related to each respective client may be stored in a respective ledger data structure. The ledger data structure may be stored in a database, in a cloud-computing system, in a distributed computing-network, or any suitable storage component.

Figure 5:
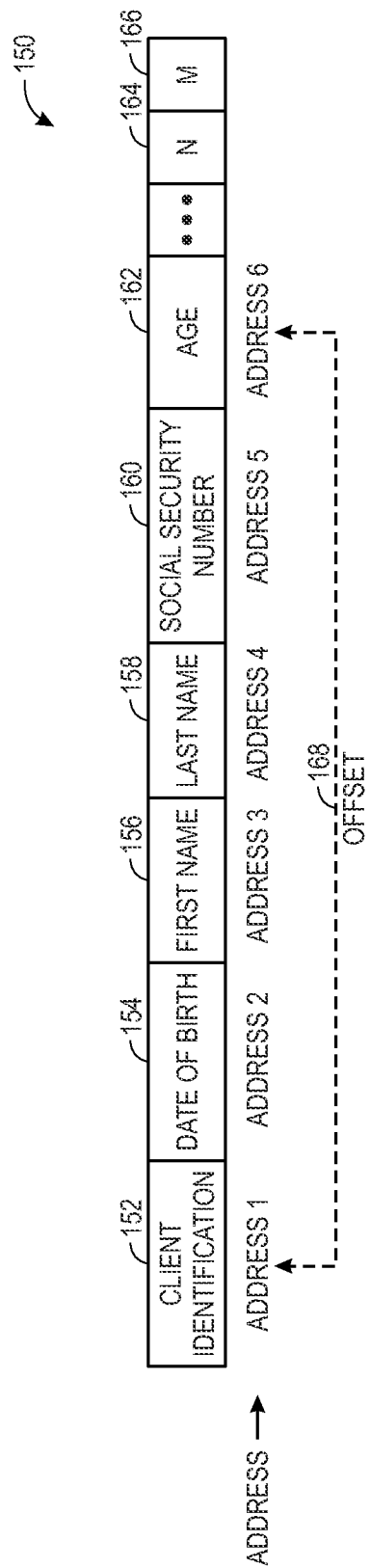
FIG. 5 illustrates an example of a client ledger 150 that may be created or modified in the course of performing the method of FIG. 4, in accordance with embodiments described herein.

With this in mind, FIG. 5 illustrates an example of a client ledger 150 that may be created or modified in accordance with the embodiments described herein. By way of example, the client ledger 150 may be stored in a particular format that includes a first entry 152 associated with the identification parameter for the client, a second entry 154 associated with date of birth, a third entry 156 and a fourth entry 158 associated with client's first name and last name, a fifth entry 160 associated with the client's social security number, a sixth entry 162 associate with client's age, and so on. As the respective device receives or creates data concerning the client, the client ledger 150 may continue growing to incorporate the additional data entries. For example, every time the client's personal data is accessed, new data (e.g., data N and M) may be appended to the client ledger 150 using new entries (e.g., entry 164 and entry 166). In some embodiments, certain data portions may be deleted in response to a specific request (e.g., from the client or one of the service departments of the organization).

In some embodiments, each entry in the client ledger 150 may be assigned an address for more efficient referencing in later data usage, such as data tracking, analysis, and query. For example, each of the entries 152, 154, 156, 158, 160, and 162 may be assigned with a unique address such as address 1, address 2, address 3, address 4, address 5, and address 6, respectively. The addresses may be assigned based on a same origin (e.g., the address 1 corresponding to the first entry 152). In this way, the first entry 152 may serve as a reference to identify the other entries of the client ledger 150. For example, the entry 162 associated with the client's age may have an offset 168 with respect to the first entry 152. The value of the offset 168 may be determined by calculating the address difference between the address 1 and the address 6. The offset 168 may be used as an offset identity for querying the client ledger to retrieving the data related to the client's age.

In an embodiment, the client ledger 150 may be stored as a blockchain that may continue to grow as new data regarding the client is received, gleaned, or determined. In addition to storing the client's personal data, the blockchain may be updated to include data service or identities of other entities that access the client's personal data. As such, the entities that access the client's personal data may be monitored and tracked. For example, referring back the method 100 of FIG. 3, after the requested data is retrieved by the server 22 to be sent to the server 42, the server 22 may modify the client ledger to include an indication that the server 42 accessed a particular part of the client's data. In this way, the different devices and/or data requestors that access data may be tracked by a locally stored client ledger.

In some embodiments, an initial number of entries of the client ledger may be associated with similar types of data for each computing device in the enterprise network 10 or outside the enterprise network 10. In this way, requests for certain types of data may be made using an offset address without knowledge of the client's identification parameter or information. Moreover, computing devices may query a number of data sources using the offset address to acquire payload data that may be used for analysis without risking exposure of the client's identification information.

Figure 6:
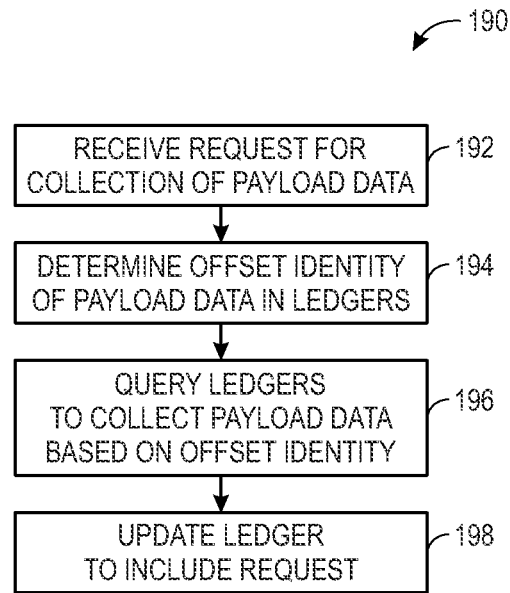
FIG. 6 illustrates a flow diagram of a method for querying client ledgers in response to receiving a request for collection of payload data, in accordance with embodiments described herein.

In some embodiments, the privacy management system 70 may facilitate requests for data to help ensure that private data is not shared with other computing devices. For example, FIG. 6 illustrates a flow diagram of a method 190 for querying client ledgers in response to receiving a request for a certain type of data. Although the method 190 described in FIG. 6 is described in a particular order and as being performed by a particular component, it should be understood that the method 190 may be performed in any suitable order and by any suitable computing device or application.

In an embodiment, the privacy management system 70 may receive a request for a type of data or payload data (block 192) via the communication component 71. For example, the payload data may be related to age data for a number of clients to perform data analysis related to the ages of the clients. With this in mind, in some embodiments, the request may include an offset value (e.g., the value of the offset 168) related to the expected location of the payload data. That is, the request may specify the offset value, as opposed to a name or identifier associated with the payload data. In this way, the request may not provide any information to other computing devices regarding the context of the requested data. To extract the requested payload data, the privacy management system 70 may determine an offset identity of the payload data in the client ledgers (block 194) based on the request. After the offset identity is determined, the privacy management system 70 may query a number of client ledgers based on the offset identity (block 196) to collect the payload data from different client ledgers. In some embodiments, the privacy management system 70 may query a number of different data sources which may store different client ledgers distributed among different locations (e.g., databases 24, 34, 44, 54, and 64) using the same offset value because each data source organizes its client ledger using the same format (e.g., the format used by the client ledger 150). By using the offset identity, the data related to the payload data (e.g., the sixth entry 162 associated with age in the client ledger 150) may be extracted efficiently along with or separate from the identification parameter. As a result, other data unrelated to the requested payload data may be removed and the truncated data structure may be sent to improve the efficiency in communicating data. In some embodiments, the privacy management system 70 may send the truncated datasets to the requesting device, and the requesting device may store the received datasets in a number of client ledgers (e.g., a blockchain) as described above.

Additionally or alternatively, the privacy management system 70 may update the client ledger associated with the requested payload data to include data related to the request (block 198). For example, the update may include an identity of the requester, purpose of making the request, data and time of the request, and the like. Such updates may enable the privacy management system 70 to facilitate data tracking and/or data exposure analysis.

It should be noted that the operations described above (e.g., the blocks 194, 196, and 198) may be performed when the client's personal data is accessed (e.g., collect, store, copy, edit, and update), combined/merged with other data, new data is generated, used to drive other data, and the like. For example, as data is analyzed and new data is attributable to a particular client identification parameter, the associated client ledger may be updated to include the newly determined data. In this way, new data generated using the client's data may be tracked in the client ledger of the device performing the analysis.

The resulting client ledger(s) created on different components may then be used to generate a privacy report that represents an amount of exposure that each client may have with respect to his or her data. Additionally or alternatively, the resulting client ledger(s) may be used to generate an inference score that may indicate what types of information concerning the client is available to other entities (e.g., data brokers).

Figure 7:
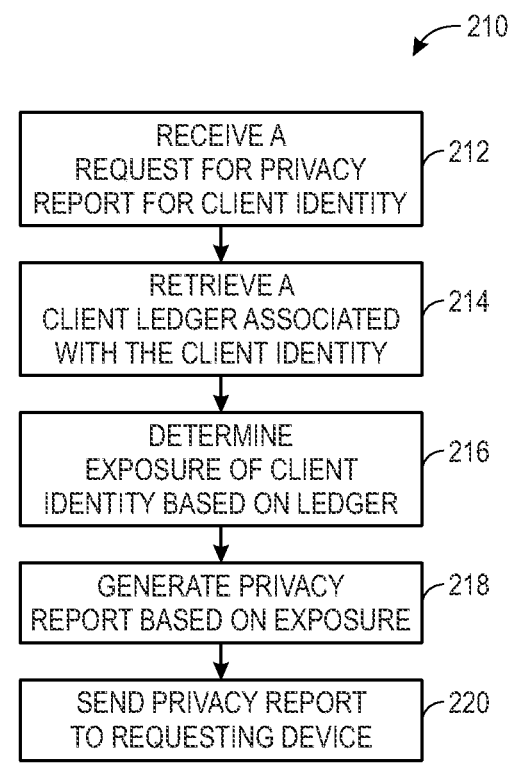
FIG. 7 illustrates a flow diagram of a method for generating a privacy report based on privacy exposure, in accordance with embodiments described herein.

With the forgoing in mind, FIG. 7 illustrates a flow diagram of generating a privacy report based on privacy exposure. Although the method 210 described in FIG. 7 is described in a particular order and as being performed by a particular component, it should be understood that the method 210 may be performed in any suitable order and by any suitable computing device or application.

In an embodiment, the privacy management system 70 may receive a request for a privacy report for a particular client identity (block 212). The request may be made from one of the service departments (such as the banking department, the debit and credit cards department, the mortgage loan department, the investment department, and the data service department) using a requesting device (e.g., a server from servers 22, 32, 42, 52, or 62).

The privacy management system 70 may retrieve a client ledger associated with the client identity (block 214). The privacy management system 70 may determine exposure of client identity based on the ledger (block 216). That is, the client ledger may indicate a number of times in which the client's data was accessed, the type of data that was accessed, time and date information related to the access, and other parameters. Using this information, the privacy management system 70 may generate a privacy report based on the exposure (block 218). For example, information related to the data accessed concerning the client may be used to determine an amount of data exposure associated with the client identification. In some embodiments, certain data types (e.g., age, social security number) may be weighted more heavily with regard to a data exposure. In some embodiments, the privacy report may provide a list of data types that were accessed and other relevant information stored in the client's ledger regarding the access of the client's data.

After determining the privacy report, the privacy management system 70 may send the privacy report to the requesting device (block 220). Continuing the example from above, the investment department may receive the privacy report related to the client's age and use the privacy report to analyze exposure of the client identity related to the client's age. The exposure analysis may include identifying type(s) of entities interested in the client's age and/or frequencies of the client's age data being accessed by the entities. Based on the exposure analysis, the investment department may provide adjusted investment options/plans for the client.

In an embodiment, after the exposure analysis based on a privacy report, the requesting device may provide instructions to the client on processes for resolving some of the privacy concerns. For example, the processes may include requesting certain entities that have data related to the client's identity to remove the data and/or provide details regarding the data in their possessions.

Third Party Privacy Monitor Application

As a summary of technologies described above, a privacy management system 70 may receive data corresponding to a number of clients from various computing devices. Based on the received data, the privacy management system 70 may determine an identity associated with each client. Using the determined identities and the received data, the privacy management system 70 may create digital ledgers to track personal data usage of the clients. Each ledger may include a header and a payload. The header may contain the identity of a respective client. The payload may include different types of data entries received by the privacy management system 70 (or any other computing device), which may store the different data entries in a particular data format or order. By tracking the data collected for each client, the privacy management system 70 may quickly analyze a privacy exposure of each client based on the respective ledger and generate a privacy report based on a privacy exposure analysis.

In some embodiments, the privacy management system 70 may provide cross-platform privacy exposure analysis operations to assess the security or privacy risks involved with using other applications that may be stored on a user's device (e.g., smart phones, tablets, or personal computers). That is, a user may have an established or trusted relationship with a particular organization that the user may use the relationship to receive one or more services (e.g., organization associated with an enterprise network). To receive these services, the user may employ an enterprise application stored on a mobile computing device to access a service (e.g., online banking) provided by the organization via the enterprise network 10.

In addition to the enterprise application, the user may also have other applications (referred to as third-party applications hereafter) stored on the same mobile computing devices to access other services (e.g., online shopping, gaming, or social networking) provided by other entities. In some embodiments, the user may enable the he enterprise application to access to the third-party applications (e.g., access to client data used by the third-party applications), such that the enterprise application may evaluate the privacy exposure or characteristics associated with the user using the third-party applications. The enterprise application may monitor operations of the third-party applications to detect whether information regarding the user or client is being transmitted to a third party. In some embodiments, the identified information being transmitted to the third parties may be compared to the data collected by the privacy management system 70 as described above. In this way, the enterprise application may perform cross-platform privacy exposure analysis on third-party applications that use the same computing device as the enterprise application. Based on the results of the privacy analysis, the enterprise application may generate a privacy report, an inference score (e.g., privacy risk, attrition risk, or fraud risk), or the like.

Figure 8:
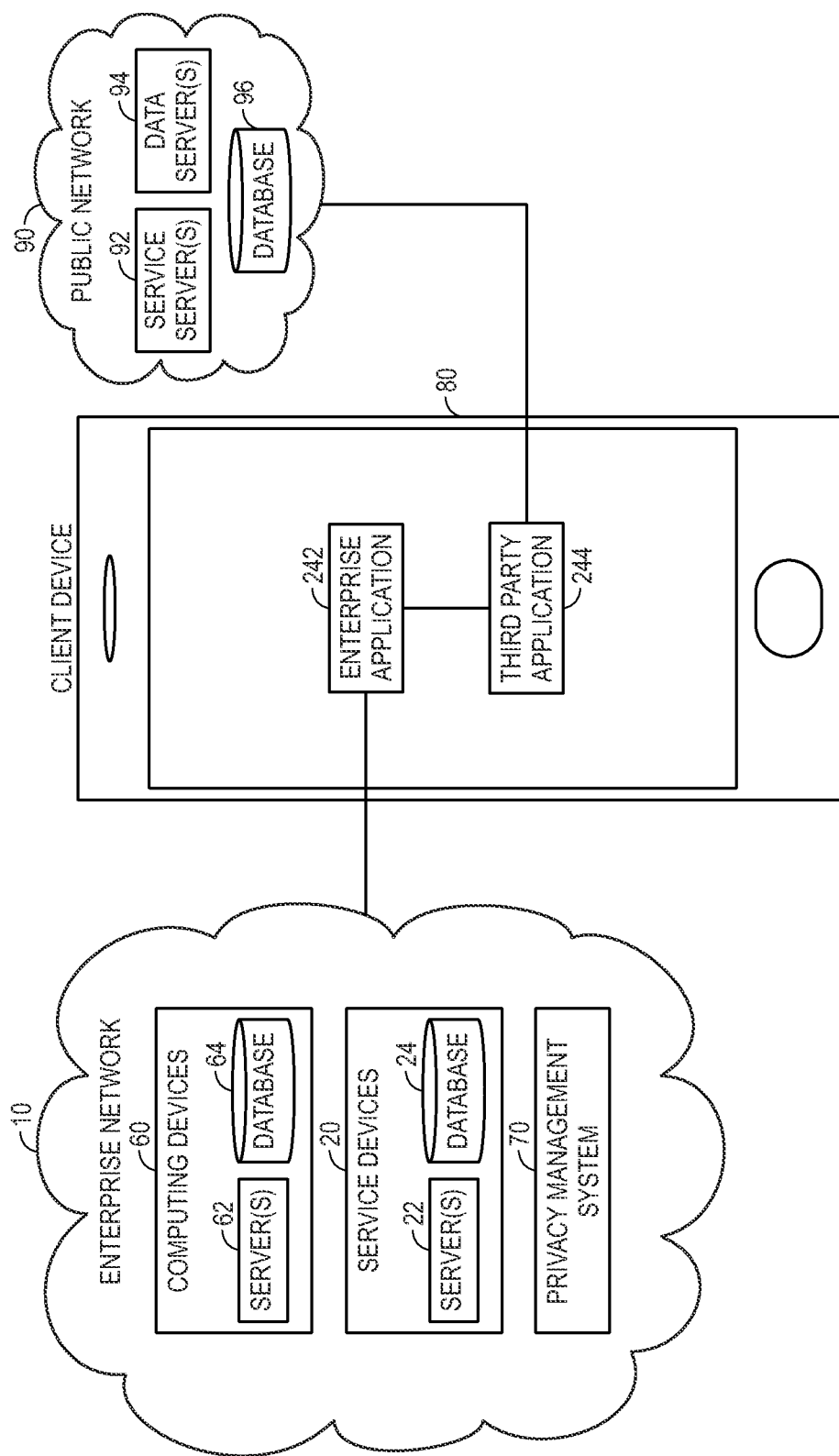
FIG. 8 illustrate a system for providing cross-platform privacy analysis using the privacy management system, in accordance with embodiments described herein.

With the preceding in mind, FIG. 8 illustrates a system for providing cross-platform privacy analysis using embodiments described herein. As introduced above, a client may use the client device 80 (such as a smartphone) to access various online services. For example, the client may use an enterprise application 242 (e.g., a bank application) stored on the client device 80 to access online banking services. The client may also use a third-party application 244 (e.g., shopping application) stored on the client device to access different services (e.g., placing online orders) that may request that the user to provide personal information to facilitate the corresponding services with the third party. In some embodiments, the enterprise application 242 may interact with the third-party application 244 to help enable the third-party application 244 to perform certain services. For example, after receiving a request for verifying client bank account information from the third-party application 244, which may be provided by an online store where the client may intend to place an online order using bank account information, the enterprise application 242 may request that the online store, via the third-party application 244, provide a store identity, a purpose of the request, and/or evidence of client's approval. It should be noted that embodiments described herein, the enterprise application 242 may also be capable of monitoring operations of the third-party application 244, such as whether cookies are enabled, identifying datasets accessed by the third-party application 244, determining that location information is acquired by the third-party application 244, and the like.

During the interactions with third-party applications including the third-party application 244, the enterprise application 242 may access memory or storage locations used by the third-party applications to identify certain client data that may be used by the third-party applications. In some embodiments, the enterprise application 242 may collect the client data used by the third-party applications, organize or format the collected data into a particular format (e.g., a ledger), perform privacy exposure analysis based on the collected data, and generate a privacy report, an inference score, or the like.

In the illustrated embodiment, the enterprise application 242 may be a desktop application (for desktop or laptop computers) or a mobile application (for mobile devices) provided by the service devices 20, computing devices 60, or the privacy management system 70. The enterprise application 242 may facilitate the client to access enterprise services hosted on servers (e.g., servers 22 or 62). The client data may be stored remotely on databases (e.g., databases 24 or 64), locally on the client device 80, or in any suitable storage component.

In the illustrated embodiment, the third-party applications may be desktop applications or mobile applications provided by the public network 90. The third-party applications (e.g., the third-party application 244) may enable the client to access third-party services hosted on servers (e.g., service servers 92 or data servers 94). The client data may be stored remotely on databases (e.g., database 96), locally on the client device 80, or combination thereof. The third-party applications may include gaming applications, social media applications, financial applications, word processing applications, statistical analysis applications, and the like.

Figure 9:
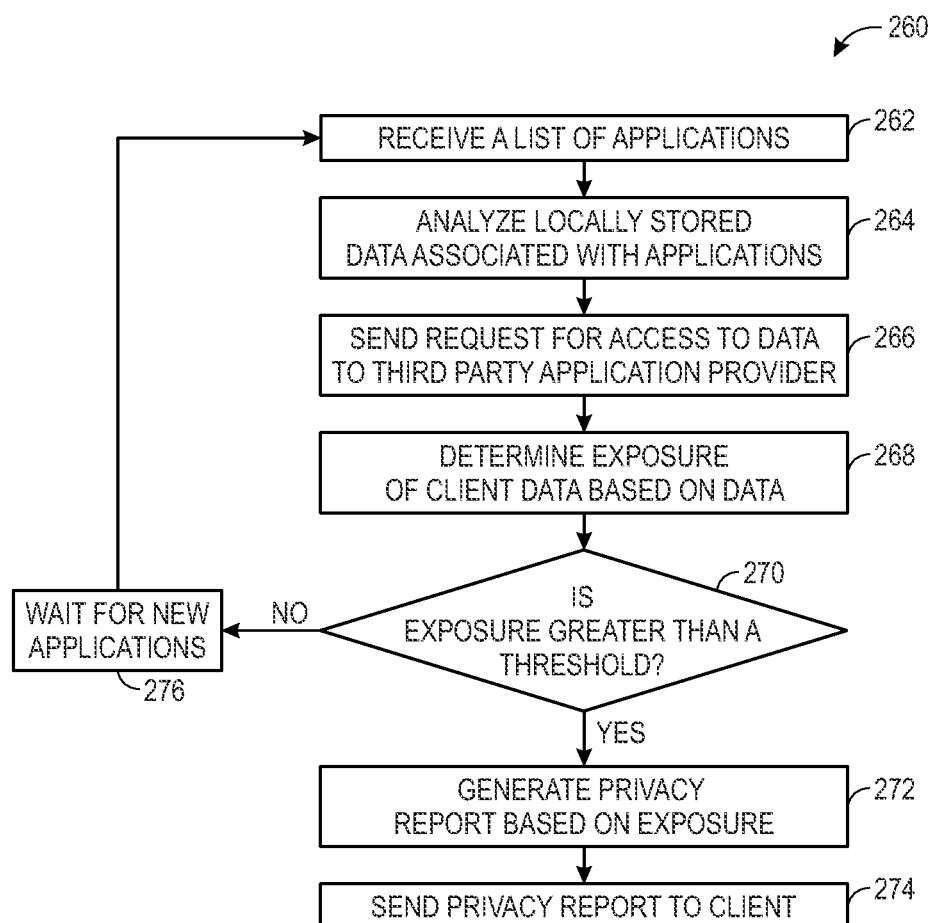
FIG. 9 illustrates a flow diagram of a method for generating a privacy report based on the cross-platform privacy analysis, in accordance with embodiments described herein.

Additional details with regard to cross-platform privacy exposure analysis, along with other technologies for consolidating privacy data exposure associated with a client into a privacy report or an off the grid score, will be discussed in detail below with reference to FIGS. 9 and 10. Referring first to FIG. 9, which illustrates a flow diagram of a method 260 for generating a privacy report based on the cross-platform privacy analysis described above. Although the method 260 described in FIG. 9 is described in a particular order and as being performed by a particular component, it should be understood that the method 260 may be performed in any suitable order and by any suitable computing device or application.

As shown in FIG. 9, at block 262, the enterprise application 242 may receive a list of applications stored on the client device. The list of applications may include each application that may be stored on the respective client device 80. As such, the enterprise application 242 may identify the third-party applications (e.g., the third-party application 244) that may request access to client's personal data. The list of applications may be generated by querying memory devices (e.g., memory devices of the client device) to identify applications that are stored in the memory devices, checking execution history to determine applications that are commonly used on the client device 80, downloading a list of applications from a cloud (e.g., the enterprise network 10 or the public network 90) that tracks the applications that were downloaded to the client device 80, receiving an input indicative of each of the applications, or any combination thereof.

Based on the list of applications, the enterprise application 242 may analyze locally stored data associated with the identified applications (block 264). The locally stored data may include permission data to use client's location, memory or storage location data related to the storage of client data, cloud data (e.g., access to client's pictures stored on a cloud-computing device or storage), and other relevant data related to client privacy information. At block 264, the enterprise application 242 may analyze the locally stored data to determine types of data that are collected by each of the applications received at block 262. In some embodiments, the enterprise application 242 may cross-reference the locally stored data to data that is stored on the client ledger as described above. That is, the enterprise application 242 may identify the information that each third-party application may have stored relative to the data that is part of the enterprise network 10.

After analyzing the locally stored data, the enterprise application 242 may send a request for access to client data that may be saved by a third-party application provider (block 266). The third-party application provider may be identified by using information stored in a database (e.g., database 24 or 64) that includes a web location in which the corresponding third-party application was downloaded, a list of third-party application providers, and the like. The data received from the third-party provider (referred to as third-party data hereafter) may be related to the locally stored data identified at block 264 and the enterprise data described above. In some embodiments, after receiving the data from the third-party applications, the enterprise application 242 may organize or format the data into a particular format (e.g., the format used by the client ledger 150), such that the received data may be more easily processed or compared to data stored in the enterprise network 10.

Based on the locally stored data associated with the list applications and the received data from the third-party providers, the enterprise application 242 may determine a privacy exposure of the client data based on the data (block 268). The privacy exposure may include identities of the entities (e.g., service providers) that have access to the data, time and/or frequencies in which the data is used, locations in which the data is used, purpose of data usage, tendencies of storing, copying, sharing, selling the data, and the like. In some embodiments, the enterprise application 242 may compare the third-party data received from the third-party providers to the data stored as enterprise data described above. Since the user or client may have an established or trusted relationship with the enterprise network 10, the user may be more willing to allow certain data to be stored in the enterprise network 10. However, if the same data that is present on the enterprise network 10 is possessed by the third-party applications, the user may be concerned that the third-party applications may have access to more data than he or she intended to afford the third-party applications.

With this in mind, at block 268, the enterprise application 242 may compare the third-party data to the data stored as part of the enterprise data. Based on this comparison, the enterprise application 242 may determine a percentage value of the data available to the third party compared to the amount of data available to the enterprise data. The percentage value may be used as a reference to evaluate a level of exposure of the client identity.

In other embodiments, the exposure of the client identity or client data may be determined based on the type of data that is available to the third-party applications. For example, data related to identification data (e.g., driver's license, social security number), location data, and other identifying attributes related to the user or client may be weighted more than data associated with shopping preferences, application usage data, or the like. In yet another embodiment, the exposure of the client data may be determined based on a comparison to the average client data available to third-party applications as determined by a number of enterprise applications 242 that are operating on multiple client devices.

At block 270, the enterprise application 242 may determine if exposure of client identity is greater than some threshold. The threshold may be based on a user input, an analysis that rates the likelihood of the clients being targeted (e.g., high profile clients, government or industry list of high risk clients, high wealth clients, or low usage clients), an average amount client data available to third-party applications, or the like. In one embodiment, the threshold may be based on the percentage value of the data available to the third party as compared to the amount of data available to the enterprise data.

In any case, at block 270, the enterprise application 242 may determine if the client data exposure is greater than the threshold. For example, if the percentage value of the data available to the third party as compared to the amount of data available to the enterprise data is greater than the threshold (e.g., 50%), the enterprise application 242 may generate a privacy report based on the determined exposure (block 272).

The privacy report generated at block 272 may include a comprehensive list of applications, data stored or accessed by the listed applications, analytic result regarding to data usage (e.g., time, frequency, location, purpose, or tendency), and other properties representative of the client's data available to the third-party applications. The privacy report may also include a tracking record of the types or portions of the client data that may be used maliciously (e.g., by certain entities) to steal someone's identity, target someone for scams, and the like. Some entities may share or sell client data (e.g., name, age, address, or picture) to other entities without the client' consent or authorization. The privacy report may further provide remedy instructions for addressing privacy violations and/or concerns. In some embodiments, the privacy report may include graph(s) to compare a privacy exposure of the client receiving services from a third party to average privacy exposure of user receiving services from the enterprise. In some embodiments, the privacy reports may include illustrations that depict usage and/or sharing of privacy data using tree diagrams or network diagrams that show applications/entities that may access the privacy data and subordinate third parties that may gain access to the privacy data. Additional details with regard to the tree diagrams and the network diagrams will be discussed below with reference to FIG. 10. It should be noted that the privacy report prepared by the enterprise application 242 may correspond to the privacy report described above with respect to FIG. 7.

After generating the privacy report, the enterprise application 242 may send privacy report to the client device 80 (block 274) to notify the client device 80. The privacy report may be sent to the client device 80 using various notifications. For example, the notifications may include a visualization displaying the content of the privacy report (e.g., text, graphs, charts, and so on), a link that automatically opens the enterprise application 242 to provide audio, visual, and/or haptic alert, or any suitable method to notify the client that the privacy report is available. The notification may cause the enterprise application 242 to automatically open regardless of the state (e.g., sleep mode) of the client device 80 to ensure that the client is notified in a timely manner to attend to the loss of privacy.

If, at block 270, the enterprise application 242 determines that the exposure of the client data is less than the threshold (e.g., 50%), the enterprise application 242 may wait for new applications (block 276) that may be used by the client to access new services to be installed on the client device 80, wait a pre-determined amount of time, or wait for a request to initiate the generation of a privacy data analysis. After waiting or receiving the request, the enterprise application 242 may return to block 262 and again perform the method described in FIG. 9.

As mentioned above, in some embodiments, the privacy reports may include illustrations that depict usage and/or sharing of privacy data using tree diagrams or network diagrams. With this in mind, FIG. 10 shows a tree diagram (FIG. 10A) including applications/entities that may access the privacy data and a network diagram (FIG. 10B) including subordinate third parties that may gain access to the privacy data.

Figure 10A:
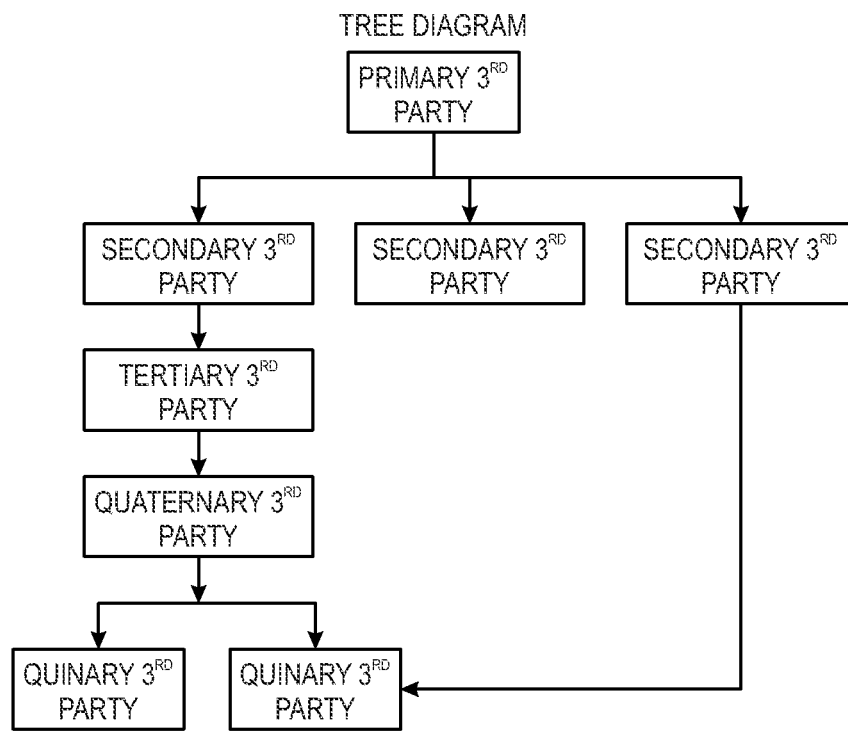
FIG. 10 illustrates a tree diagram including applications/entities that may access privacy data and a network diagram including subordinate third parties that may gain access to the privacy data.

In the tree diagram of FIG. 10A, multiple third parties accessing privacy data of a client may be included in a tree structure representative of a hierarchy of the different third parties at different levels that may gain access to the privacy data through the tree structure. In some embodiments, the access to privacy data may be sequential. In the illustrated example, a quinary third party may access the privacy data sequentially through multiple third parties at intermediate levels (e.g., quaternary, tertiary, and secondary third parties) before reaching a primary third party that have the access to the privacy data directly. Additionally or alternatively, another quinary third party may access the privacy data sequentially through less intermediate levels (e.g., another secondary third party only) before reaching the primary third party.

It should be noted that the tree diagram described above is an exemplary tree diagram and the tree diagram may include additional or fewer levels of third parties, and/or additional or fewer third parties at each level as shown.

Figure 10B:
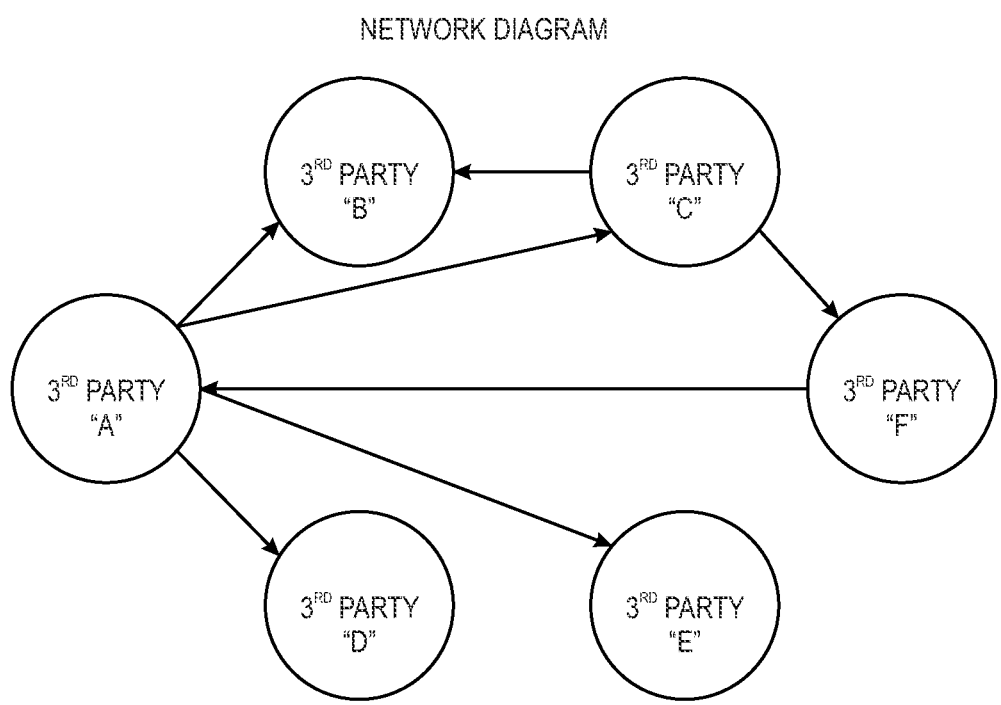

In the network diagram of FIG. 10B, multiple third parties may form a network, through which the privacy data may be transferred directly or indirectly between two third parties. In one embodiment, a third party (e.g., third parties B, C, D, E, or F) may gain access to at least a portion of the privacy data of the client directly through a third party A. In another embodiment, the third party F may access certain types/portions of the privacy data indirectly (e.g., sequentially) through the third parties C and B before reaching the third party A that may be a primary entity having access to the privacy data.

It should be noted that the network diagram described above is an exemplary network diagram. The network diagram may include any type of suitable network topologies, including, but not limited to, mesh topology, start topology, bus topology, ring topology, hybrid topology, and the like.

Figure 11:
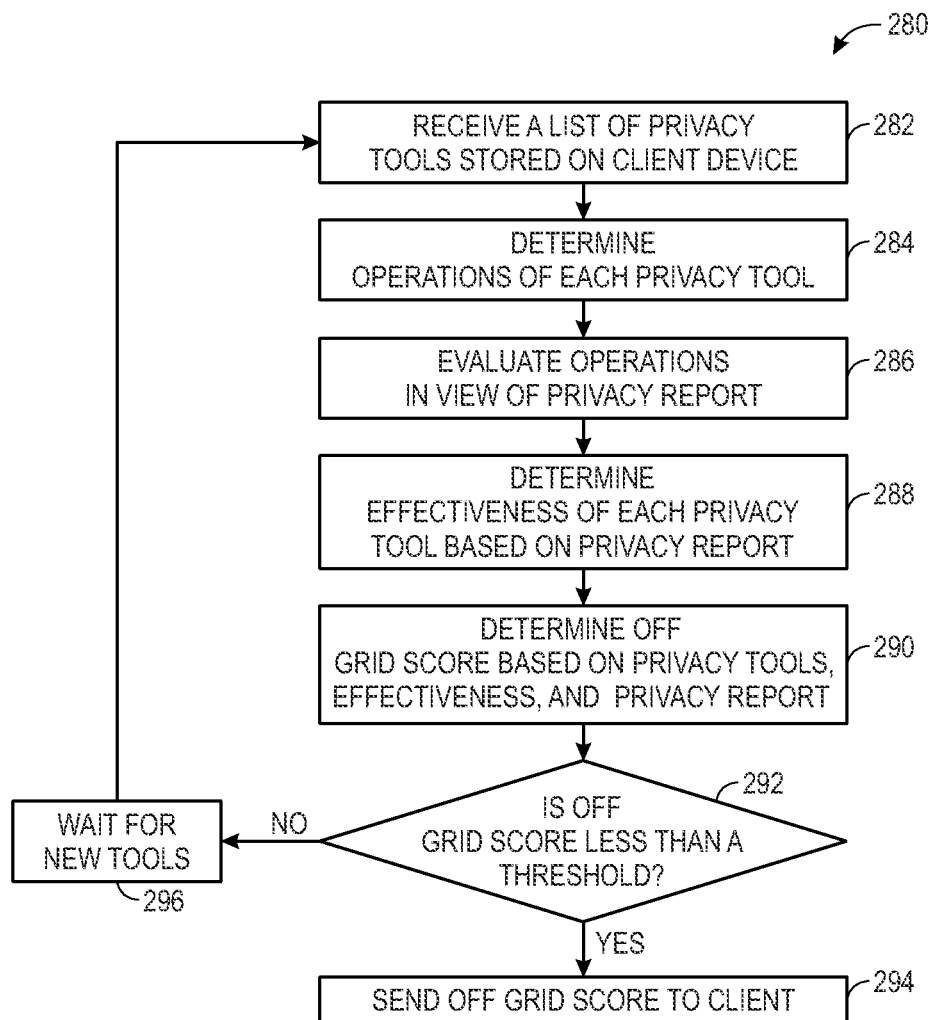
FIG. 11 illustrates a flow diagram of a method for generating an off-grid score based on the cross-platform privacy analysis, in accordance with embodiments described herein.

In some embodiments, the client may use privacy protection tools stored on the client device 80 to limit personal data being used by various entities or third-party applications. An evaluation (such as a quantitative evaluation) based on the performance (e.g., effectiveness) of the privacy protection tools may help the client understand the value of using such tools and determine whether other tools may be used to provide more effective privacy protection. With this in mind, FIG. 11 illustrates a flow diagram of a method 280 for generating an off-grid score representative of the effectiveness of the client's use of privacy tools.

Certain privacy protection tools may be available for the client to decrease his or her private data exposure. For example, some privacy protection tools may anonymize data or metadata transmitted via browsers, operating systems, and the like. In addition, browser extensions may prevent cookies from being acquired via the client devices while the client browses certain websites or uses certain third-party applications. In some embodiments, services may include randomizing identification information sent to servers of other entities. In some cases, based on whether these services are being used, the enterprise application 242 may determine an off-the-grid score that represents effectiveness of these services based on privacy protection. That is, the off-the-grid score may correspond to the client's vigilance in protecting his or her privacy data. In some embodiments, the enterprise application 242 may monitor the off-the-grid score and generate a notification when the score is less than some threshold.

At block 282, the enterprise application 242 may receive a list of privacy tools stored on the client device 80. The list of privacy tools may include privacy tools provided by the enterprise network 10 and third-party privacy tools that may request access to client's personal data related to the respective enterprise privacy tools. The list of privacy tools may be generated by querying memory devices (e.g., memory devices of the client device) to identify privacy tools that are stored in the memory devices, checking execution history to determine privacy tools that are commonly used on the client device 80, downloading a list of privacy tools from a cloud (e.g., the enterprise network 10 or the public network 90) that tracks the privacy tools that were downloaded to the client device 80, receiving an input indicative of each of the privacy tools, or combination thereof.

Based on the list of privacy tools, the enterprise application 242 may determine operations of each privacy tool (block 284). These operations may include enforcing passwords and data encryption, enforcing company policies, blocking unknown devices attempting to access the client data, distributing antivirus and other malware software and filters, securing browsers, supporting containerization, and the like.

After determining operations of each privacy tool, the enterprise application 242 may evaluate the operations in view of the privacy report (block 286), which is generated based on exposure of the client identity. The evaluations may be performed according to certain categories used in the privacy report. For example, the evaluations may include analyzing the type of the privacy protection tools, the protection features used by the tools (e.g., enforced passwords), the user-friendly features of the tools, and the like.

After evaluating the operations of each privacy protection tool, the enterprise application 242 may determine an effectiveness of each privacy tool based on the privacy report (block 288). For example, the effectiveness may be determined relative to a 100% secure tool or application that shares no information regarding a user or client. As such, a privacy tool allows limited access to client photos, and use of such tool may be identified in the privacy report.

The effectiveness of each privacy protection tool may be used to provide quantitative evaluation for each tool. The quantitative evaluation may help the client to choose better privacy protection tools to reduce privacy exposure. For example, the enterprise application 242 may determine an effectiveness for each privacy protection tool based on the privacy tools being analyzed and the privacy report (block 290).

Based on the privacy tools, the effectiveness of the privacy tools, and the privacy report, the enterprise application 242 may determine an off-grid score representative of the client's proactive measures to protect his or her data. For example, the enterprise application 242 may determine the off-grid score based on a number of the privacy tools used, the types of the privacy tools used, the effectiveness of the privacy tools, the type of the passwords used (e.g., hashed passwords, password length, password complexity), type of encryptions used (e.g., split-key encryptions), type of personal data transitions (e.g., data transferred with additional security layers), and the like.

In one embodiment, the off-grid score may be scaled using a range of number (e.g., 1 to 10, 1 to 100, 0 to 99). For example, in an off-grid score using a range of 1-100, a 100 score may represent a case where no personal data of the client is available for accessing by third-party entities and data security may be in a highest level. As a comparison, a 0 score may represent all personal data of the client is available to third-party entities and the data security may be in the lowest level. In some embodiments, weights may be added to scale the off-grid score in a different way (e.g., normalization). The added weights may be associated with certain particular aspects of the client personal data. For example, the client may concern age information more than other aspects of his or her personal data. As such, an age-related weight may be added when determining the off-grid score and the resulting score may address the client concern more appropriately.

After the off-grid-score is determined, the enterprise application 242 may determine whether the off-grid score is less than a threshold (block 292). The threshold value may be defined by the client with respect to the off-grid score. In some embodiments, the threshold may be changed dynamically based on an average off-grid score of the privacy protection tools used, and/or based on changes (e.g., caused by privacy tool adjustments made by the client) after the client received the privacy report.

If the determined off-grid score is less than the threshold (e.g., 50, 75), the enterprise application 242 may send the off-grid score to the client device 80 (block 294). The off-grid score may be sent to the client device 80 using various notifications. For example, the notifications may include a visualization displaying the current off-grid score in comparison to previous score(s) and/or to the average off-grid score (e.g., text, graphs, charts, and so on), a link that automatically opens the enterprise application 242 to provide audio, visual, and/or haptic alert, or any suitable method to notify the client that the off-grid score is available. Like the notifications described above, the notification that causes the enterprise application 242 to open automatically may cause the enterprise application 242 to automatically open regardless of the state (e.g., sleep mode) of the client device 80 to ensure that the client is notified in a timely manner to attend to the loss of privacy.

If, at block 292, the enterprise application 242 determines the off-grid score is greater than the threshold, the enterprise application 242 may wait for new privacy protection tools (block 296) that may be used by the client to access new privacy protection services to be installed on the client device 80, wait a pre-determined amount of time, or wait for a request to initiate the generation of an off-grid score. The enterprise application 242 may return to block 262 and again perform the method described in FIG. 11.

The technologies described in the disclosed embodiments include consolidating privacy data exposure analysis associated with the users into privacy reports or off-grid scores. The privacy report may include a list of applications or tools, users' data stored or accessed by the listed applications or tools, analytic result regarding to users' data usage, tracking records of types or portions of users' data used maliciously by third-party applications or tools, and other properties representative of the users' data available to the third-party applications or tools. The privacy report may help the users become more aware of their privacy exposure. For example, the privacy report may provide some reference (e.g., percentage value, other users with similar age, or other users with similar wealth) to evaluate levels of privacy exposure of the users' identities. The percentage value may be related to an amount of the users' data that is available to other entities compared to the amount of data available to trusted entities. The privacy report may be used to notify or alert the users that their privacy data may be misused by other entities. In some embodiments, the privacy report may provide remedy instructions for addressing privacy violations and/or concerns, or may notify the enterprise, or a proxy designated by the client. For example, the remedy instructions may include recommendations for users to use longer and/or more complex characters when creating/updating passwords.

In addition to the privacy reports, the off-grid scores based on privacy exposure analysis may provide quantitative evaluations that may help the users to choose privacy protection tools to reduce privacy exposure more effectively. For example, the off-grid scores may be scaled numbers (e.g., 0-100) determined by evaluating effectiveness of the privacy protection tools based on the cross-platform privacy exposure analysis. In some embodiments, the users may choose different privacy protection tools that may specialize in certain data types (e.g., age, bank account number, credit card numbers, social security number, personal picture). Accordingly, the off-grid scores may be determined with more weights associated with such data types with regard to data exposure. Updated off-grid scores (e.g., weighted scores) may be provide to the users with historical scores, such that the users may determine whether the different privacy protection tools reduce privacy exposure.

It should be noted that the notifications regarding the privacy report or off-grid scores may, when received by a computing device, may cause the computing device to open an application or execute a program to provide an alert (e.g., visual, audible, haptic) to notify the user of the risk of privacy data exposure or status of privacy data exposure. In this way, the present embodiments may transform or analyze a set of data regarding privacy exposure of a user to determine a privacy report or off-grid score that may be relevant to the user. That is, the privacy report or the off-grid score may contextualize the exposure of the privacy data for the user, such that the user is aware of the risk of privacy data exposure. In addition, by analyzing the privacy data exposure and other parameters with respect to a threshold, the present embodiments described herein may limit the number of notifications or the heightened alert levels to those that are more than a certain threshold.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a storage component configured to store a plurality of applications and a plurality of datasets associated with a user; and
a computing device having the plurality of applications currently installed and configured to execute each of the plurality of applications, wherein a first application of the plurality of applications is configured to perform operations comprising:
identifying a portion of the plurality of datasets collected by a second application of the plurality of applications;
retrieving enterprise data from a client ledger of a blockchain corresponding to the user stored on an enterprise network inaccessible to the second application, wherein the enterprise data is associated with a trusted entity of the user, and wherein the client ledger is updated based on access to data associated with the user;
determining a level of exposure of the enterprise data by comparing the portion of the plurality of datasets to the enterprise data to determine a percentage value of the enterprise data that is available to the second application in the portion of the plurality of datasets;
generating a privacy report with respect to the second application of the plurality of applications in response to the percentage value being greater than a threshold percentage value, wherein the privacy report is generated based on the portion of the plurality of datasets; and
generating a visualization representative of the privacy report for view via an electronic display of the computing device.

2. The system of claim 1, wherein the plurality of datasets is organized into a format comprising an identification field associated with the user.

3. The system of claim 2, wherein the first application is configured to organize the plurality of datasets into the format.

4. The system of claim 1, wherein the first application is configured to perform the operations comprising determining a privacy exposure based on a manner in which the portion of the plurality of datasets is used by the second application.

5. The system of claim 4, wherein the first application is configured to perform the operations comprising determining the privacy exposure by:
determining whether one or more cookies are enabled while at least a portion of the plurality of applications is active; and
determining whether location data is acquired while the at least a portion of the plurality of applications is active.

6. The system of claim 1, wherein the privacy report comprises a diagram indicative of usage of the portion of the plurality of datasets.

7. The system of claim 6, wherein the diagram comprises a tree diagram indicative of a hierarchy of a plurality of entities accessing the portion of the plurality of datasets.

8. The system of claim 6, wherein the diagram comprises a network diagram indicative of one or more transfers of the portion of the plurality of datasets between a plurality of entities.

9. A method, comprising:
receiving, via a processor associated with a computing device having a plurality of applications currently installed, a plurality of datasets associated with a user and stored on a storage component, and wherein the plurality of applications comprises at least a first application and a second application;
identifying, via the processor, a portion of the plurality of datasets collected by the second application of the plurality of applications;
retrieving, via the processor, enterprise data from a client ledger of a blockchain corresponding to the user stored on an enterprise network inaccessible to the second application, wherein the enterprise data is associated with a trusted entity of the user, and wherein the client ledger is updated based on access to data associated with the user;
determining, via the processor, a level of exposure of the enterprise data by comparing the portion of the plurality of datasets to the enterprise data to determine a percentage value of the enterprise data that is available to the second application in the portion of the plurality of datasets;
generating, via the processor, a privacy report with respect to the second application of the plurality of applications in response to the percentage value being greater than a threshold percentage value, wherein the privacy report is generated based on the portion of the plurality of datasets;
determining, via the processor, a privacy exposure with respect to the second application based on the percentage value being greater than the threshold percentage value; and
generating, via the processor, a visualization representative of the privacy report comprising the privacy exposure for view via an electronic display of the computing device.

10. The method of claim 9, comprising:
receiving, via the processor, a list of the plurality of applications, wherein receiving the list of the plurality of applications comprises querying the storage component to identify the plurality of applications, checking execution history to identify the plurality of applications executed on via the processor, downloading the list of the plurality of applications from a cloud storage component, receiving an input indicative of the plurality of applications, or any combination thereof; and
determining, via the processor, a plurality of types of data associated with the user and stored in the storage component.

11. The method of claim 9, wherein the plurality of datasets comprises permission data associated with accessing a location of the user.

12. The method of claim 9, wherein determining the privacy exposure associated with the user comprises determining a number of times that the enterprise data was accessed by the second application of the plurality of datasets.

13. The method of claim 9, wherein the privacy exposure is associated with one or more types of data associated with identity information of the user.

14. The method of claim 9, wherein the privacy exposure is associated with a number of instances in which each of the portion of the plurality of datasets is used in a storing operation, a copying operation, a sharing operation, or any combination thereof.

15. The method of claim 9, wherein determining the privacy exposure associated with the user comprises applying different weights to different types of the portion of the plurality of datasets.

16. A non-transitory, computer-readable medium storing instructions, that when executed by one or more processors associated with a computing device having a plurality of applications currently installed, are configured to cause the one or more processors to perform operations via a first application of the plurality of applications comprising:
receiving a plurality of datasets associated with a user and stored on a storage component;
identifying a portion of the plurality of datasets collected by a second application of the plurality of applications;
retrieving enterprise data from a client ledger of a blockchain corresponding to the user stored on an enterprise network inaccessible to the second application, wherein the enterprise data is associated with a trusted entity of the user, and wherein the client ledger is updated based on access to data associated with the user;
determining a level of exposure of the enterprise data by comparing the portion of the plurality of datasets to the enterprise data to determine a percentage value of the enterprise data that is available to the second application in the portion of the plurality of datasets;
generating a privacy report with respect to the second application of the plurality of applications in response to the percentage value being greater than a threshold percentage value, wherein the privacy report is generated based on the portion of the plurality of datasets;
determining a privacy exposure with respect to the second application based on the percentage value being greater than the threshold percentage value; and
generating a visualization representative of the privacy report for view via an electronic display of the computing device.

17. The non-transitory, computer-readable medium of claim 16, wherein the instructions, when executed, are configured to cause the one or more processors to further perform operations via the first application comprising determining a number of times that the enterprise data was accessed by the second application of plurality of applications.

18. The non-transitory, computer-readable medium of claim 16, wherein the privacy exposure comprises a number of instances in which each portion of the plurality of datasets is used.

* * * * *